UNITED STATES PATENT OFFICE.

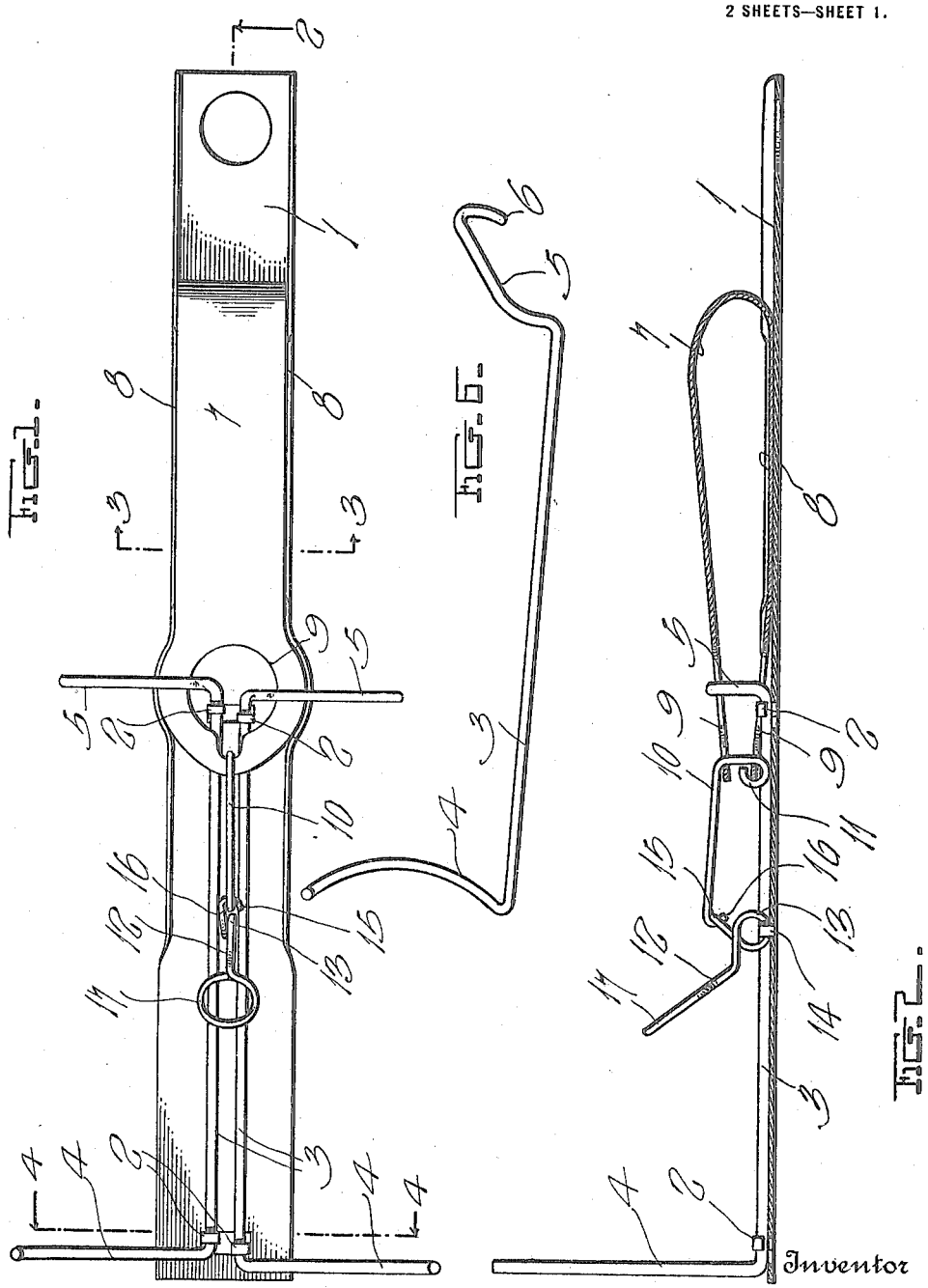

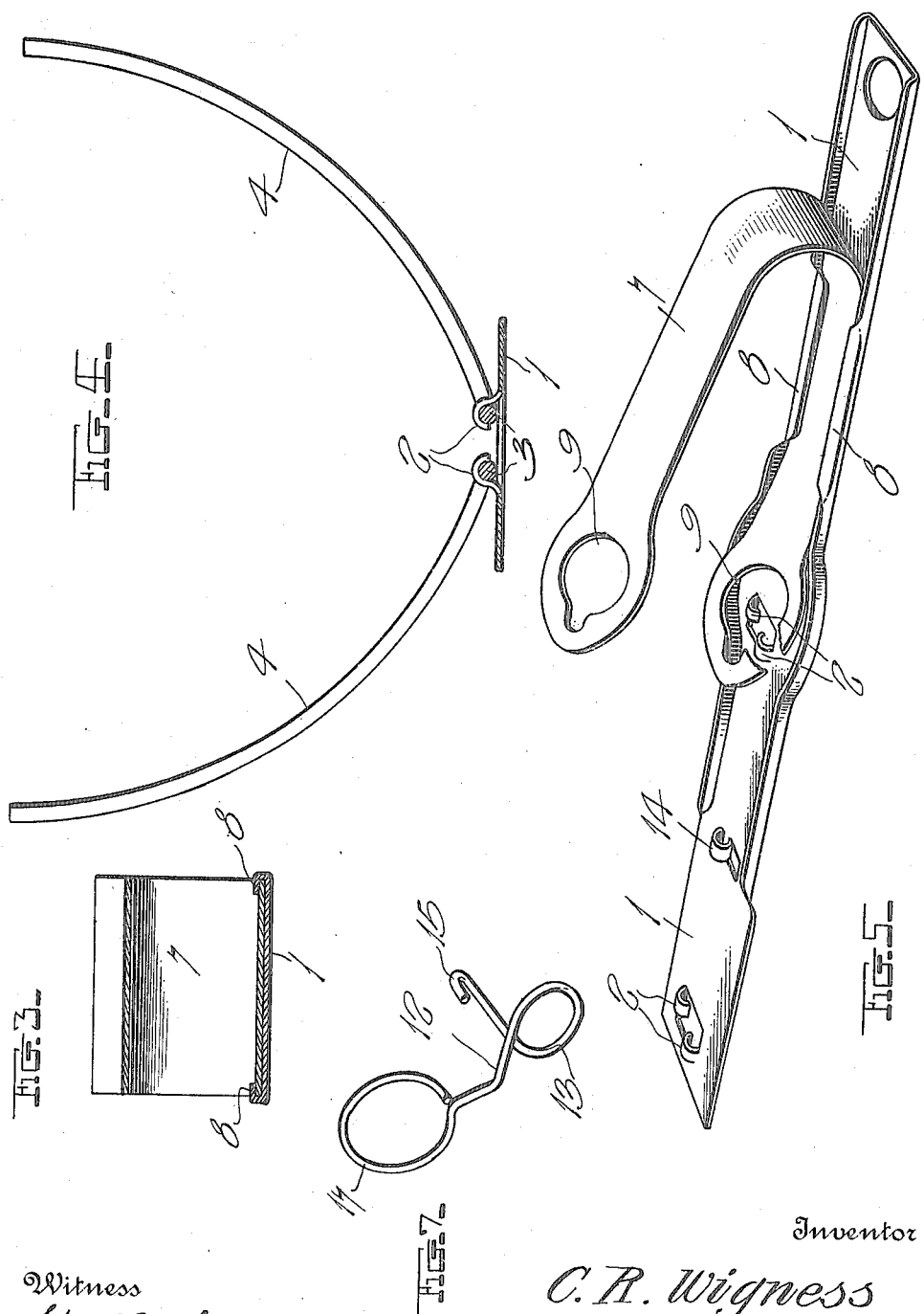

CORNELIUS R. WIGNESS, OF HARLAN, IOWA, ASSIGNOR OF ONE-HALF TO CHARLIE G. SORENSEN, OF HARLAN, IOWA.

TRAP.

1,270,907.   Specification of Letters Patent.   Patented July 2, 1918.

Application filed April 23, 1917. Serial No. 163,899.

*To all whom it may concern:*

Be it known that I, CORNELIUS R. WIGNESS, a subject of the King of Norway, residing at Harlan, in the county of Shelby and State of Iowa, have invented certain new and useful Improvements in Traps; and I do declare the following to be a full, clear, and exact description of the invention, such as will enable others skilled in the art to which it appertains to make and use the same.

My invention has for its object to provide a simply constructed and inexpensive, yet a highly efficient device for trapping animals such as gophers, muskrats, woodchucks and the like, the trap being so constructed as to permit positioning thereof in the burrow or runway of the prey.

With the foregoing general object in view, the invention resides in the novel features of construction, and unique combinations of parts to be hereinafter fully described and claimed, the descriptive matter being supplemented by the accompanying drawings which form a part of this specification and in which:—

Figure 1 is a top plan view of the improved trap in set position;

Fig. 2 is a vertical longitudinal section on the plane of the line 2—2 of Fig. 1;

Figs. 3 and 4 are vertical transverse sections on the planes of the line 3—3 and 4—4 of Fig. 1;

Fig. 5 is a perspective view of the base, part of the operating spring, and the latch for holding said spring under tension;

Fig. 6 is a perspective view of one of the rock shafts carrying a jaw at one end and an operating arm at the other; and Fig. 7 is a perspective view of the trigger.

In the drawings above briefly described, the numeral 1 has reference to a base formed of a strip of sheet metal having longitudinally spaced tongues 2 struck upwardly therefrom and bent into the form of loops receiving therein a pair of longitudinally extending rock shafts 3, which shafts are preferably formed of heavy wire with their front ends bent laterally and suitably curved to form a pair of jaws 4, while the rear ends of said shafts are similarly bent to provide a pair of operating arms 5, the outer ends of said arms being bent to form stop fingers 6 for a purpose to appear.

A substantially C-shaped spring 7 rests on the end of the base 1 remote from the shafts 3 and the edges 8 of said base are clenched around the lower arm of said spring to hold it rigidly in place. The ends of spring 7 are formed with openings 9 through the uppermost of which the arms 5 pass, whereas a latch 10 rises through both of said openings and at 11 is bent around the front end of the lower arm, whereby said latch is pivotally mounted. The latch 10 is adapted to be positioned horizontally as shown in Fig. 2, in order that it may hold the spring 7 in set position, and to prevent the return of said latch to normal position until tripped, a trigger 12 is provided.

The trigger 12 is preferably formed of a single piece of wire bent adjacent its lower end to form an eye 13 passing through a loop 14 struck upwardly from the base 1, said lower end of the wire extending laterally from the eye and being bent to form a hook 15 coöperating with a similar formation 16 on the free end of the latch 10. The upper end of the wire, of which the trigger 12 is formed, is bent into the shape of a loop as shown at 17 and is adapted to be struck by the animal in whose runway the trap is set.

In operation, the trap is set by depressing the spring 7 and holding it in this position by the latch 10 and trigger 12, the two jaws 4 being now free to move inwardly the required amount to permit the entire device to be inserted in the burrow or runway. The loop 17 of the trigger 12 is now in the path of an animal in the runway with the result that the same will be struck and released, whereupon spring 7 comes into play and forces the arms 5 to a substantially vertical position, thus closing the jaws 4 around the body of the prey. It will be observed that the fingers 6 limit the upward movement of the spring 7 so that the latter cannot move from engaging with the arms 5 and thus holds the jaws 4 in closed position.

From the foregoing, taken in connection with the accompanying drawings, it will be observed that although the improved trap is of simple and inexpensive nature, it will be highly efficient. Since probably the best results are obtained by the specific construction shown and described, this construction constitutes the preferred form of the device, but it is to be understood that within the scope of the invention as claimed, numerous minor changes may be made without sacrificing the principal advantages.

I claim:—

A trap comprising a base formed of a single narrow strip of sheet metal having its edges bent upwardly throughout the greater part of its length to form reinforcing flanges, said flanges being bowed outwardly near the center of the base, a C-shaped spring having one arm disposed above the other, the free ends of said arms having vertically alined openings, the lower end of said spring resting on said base between and in contact with said flanges and having an enlarged free end received between and in contact with said outwardly bowed portions of said flanges, part of the length of said flanges being clenched downwardly upon said lower arm of the spring to secure the latter in place, a pair of longitudinal rock shafts mounted on said base and having their inner ends received under said enlarged end of the lower spring arm and provided with operating arms extending through the openings of both arms of said spring, the outer ends of said shafts having lateral jaws, a latch pivoted to the lower spring arm and adapted for passage through the opening of the other arm to hold this arm lowered, and a trigger pivoted to the base for holding said latch in set position.

In testimony whereof I have hereunto set my hand in the presence of two subscribing witnesses.

CORNELIUS R. WIGNESS.

Witnesses:
CARL HANSEN,
G. K. SENFT.

Copies of this patent may be obtained for five cents each, by addressing the "Commissioner of Patents, Washington, D. C."